(12) United States Patent
Surnilla

(10) Patent No.: US 6,662,638 B2
(45) Date of Patent: Dec. 16, 2003

(54) SYSTEM AND METHOD FOR DETERMINING DEGRADATION OF AN EXHAUST GAS SENSOR IN AN ENGINE

(75) Inventor: Gopichandra Surnilla, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 34 days.

(21) Appl. No.: 09/992,949

(22) Filed: Nov. 26, 2001

(65) Prior Publication Data

US 2003/0097873 A1 May 29, 2003

(51) Int. Cl.[7] ............................................... G01M 15/00
(52) U.S. Cl. ..................................................... 73/118.1
(58) Field of Search ........................... 73/118.1, 117.3, 73/23.31, 23.32, 116; 60/274, 275, 276, 277, 285; 123/688

(56) References Cited

U.S. PATENT DOCUMENTS

| | | | |
|---|---|---|---|
| 5,533,332 A | | 7/1996 | Uchikawa |
| 5,781,878 A | * | 7/1998 | Mizoguchi et al. ......... 701/109 |
| 5,966,930 A | | 10/1999 | Hatano et al. |
| 2001/0010220 A1 | | 8/2001 | Shinjyo et al. |

FOREIGN PATENT DOCUMENTS

| | | |
|---|---|---|
| EP | 1118758 A2 | 7/2001 |
| EP | 1134378 A2 | 9/2001 |

* cited by examiner

*Primary Examiner*—Kamand Cuneo
*Assistant Examiner*—Monica D. Harrison

(57) ABSTRACT

A system and method for determining degradation of a post-catalyst exhaust gas sensor in an engine is provided. The engine is coupled to one or more exhaust gas catalysts. The method includes generating a first signal from a first exhaust gas sensor disposed downstream of a first catalyst. The method further includes determining an amount of oxygen supplied to one of the catalysts. Finally, the method includes determining degradation of the first exhaust gas sensor based on the amount of supplied oxygen and the first signal.

16 Claims, 6 Drawing Sheets

SYSTEM AND METHOD FOR DETERMINING DEGRADATION OF AN EXHAUST GAS SENSOR IN AN ENGINE

FIELD OF THE INVENTION

The invention relates to a system and method for determining degradation of an exhaust gas sensor downstream of an exhaust catalyst in an engine.

BACKGROUND OF THE INVENTION

To meet current emission regulations, automotive vehicles must regulate the air-fuel ratio supplied to the vehicles' engine cylinders to achieve maximum efficiency of exhaust gas catalysts. For this purpose, it is known to control the air-fuel ratio of internal combustion engines using an exhaust gas oxygen sensor positioned in the exhaust stream from the engine. The exhaust gas sensor provides feedback data to an electronic controller that calculates desired air-fuel ratio values over time to achieve optimum efficiency of a catalyst in the exhaust system. It is also known to have a system with two exhaust gas sensors in the exhaust stream in an effort to achieve more precise air-fuel ratio control with respect to a catalyst operational window. Normally, a pre-catalyst exhaust gas oxygen sensor is positioned upstream of the catalyst and a post-catalyst exhaust gas oxygen sensor is positioned downstream of the catalyst.

In connection with an engine having two groups of cylinders, it is known to have a two-bank exhaust system coupled thereto where each exhaust bank has a catalyst as well as pre-catalyst and post-catalyst exhaust gas sensors. Each of the exhaust banks corresponds to a group of cylinders in the engine. The feedback signal received from the exhaust gas sensors are used to calculate the desired air-fuel values in their respective group of cylinders at any given time.

Known engine control systems have also implemented strategies for determining when a pre-catalyst exhaust gas sensor becomes degraded. However, known engine control systems assume that post-catalyst exhaust gas sensors do not degrade since the sensors are buffered from a majority of the exhaust gases by the upstream catalyst. Thus, when a post-catalyst exhaust gas sensor does become degraded, an engine control system using a degraded output signal from the post-catalyst exhaust gas sensor will be unable to maintain optimal air-fuel values for optimal catalyst efficiency. Thus, the degraded post-catalyst exhaust gas sensor may result in increased emissions and decreased fuel economy.

The inventors herein have therefore recognized that there is a need for a system and method that determines when a post-catalyst sensor becomes degraded.

SUMMARY OF THE INVENTION

The foregoing problems and disadvantages are overcome by a system and method for determining degradation of a post-catalyst exhaust gas sensor in an engine in accordance with the present invention.

A method for determining degradation of a first exhaust gas sensor in an engine is provided. The engine is coupled to one or more exhaust gas catalysts for decreasing emissions. The method includes generating a first signal from a first exhaust gas sensor disposed downstream of a first catalyst. The method further includes determining an amount of oxygen supplied to one of the catalysts. Finally, the method includes determining degradation of the first exhaust gas sensor based on the amount of supplied oxygen and the first signal.

A system for determining degradation of a post-catalyst exhaust gas sensor utilized in an engine is also provided. The engine includes first and second cylinder banks coupled to first and second catalysts, respectively. The system includes a first exhaust gas sensor coupled downstream of the first catalyst generating a first signal. The system further includes a controller operably coupled to the first exhaust gas sensor. The controller is configured to determine an amount of oxygen supplied to one of the first and second catalysts. The controller is further configured to determine degradation of the first exhaust gas sensor based on the amount of supplied oxygen and said first signal.

Thus, the inventive system and method can determine when a post-catalyst exhaust gas sensor becomes degraded.

DESCRIPTION OF EMBODIMENTS

Figure 1:
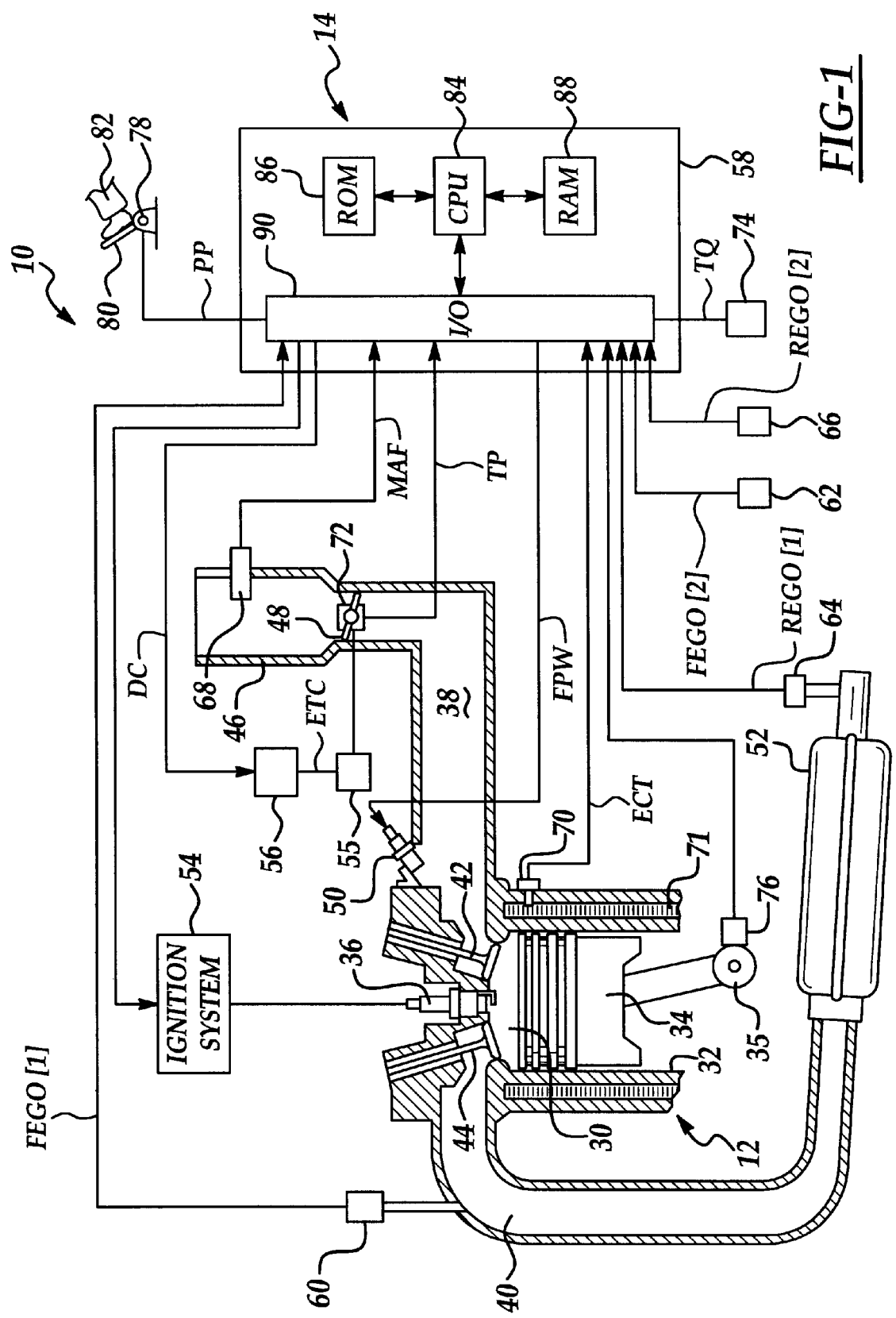
FIG. 1 is block diagram of an automotive vehicle having an engine and an engine control system.
Figure 2:
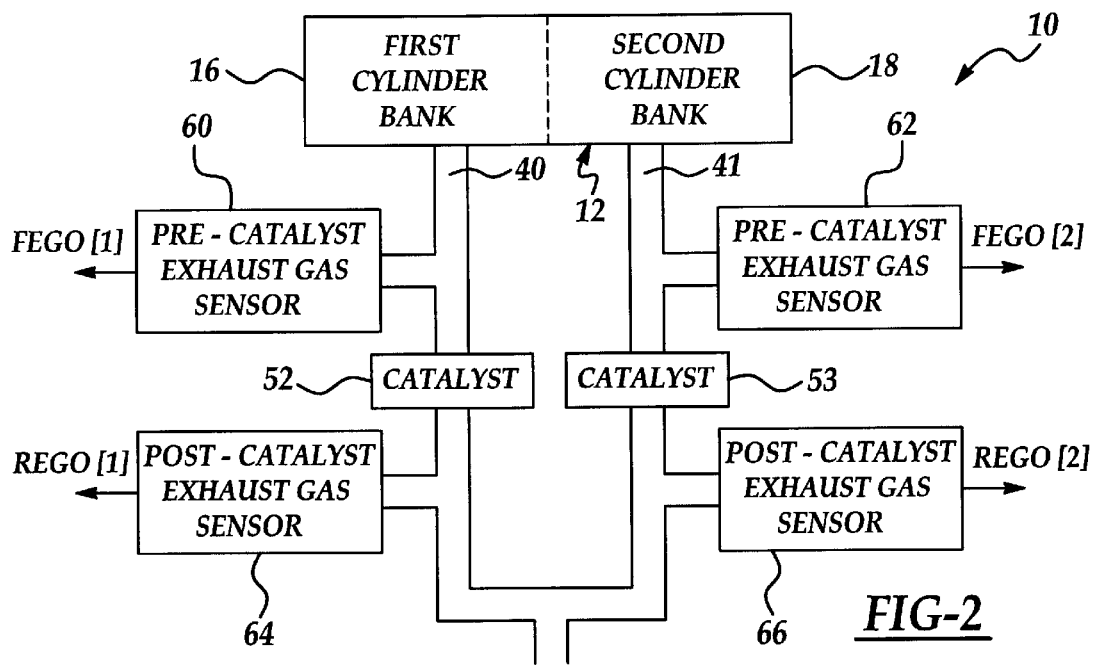
FIG. 2 is a block diagram the engine of FIG. 1 illustrating dual exhaust banks.

Referring now to the drawings, like reference numerals are used to identify identical components in the various views. Referring to FIGS. 1 and 2, an automotive vehicle 10 is shown that can be used to implement a method for determining sensor degradation in accordance with the present invention. Vehicle 10 includes an internal combustion engine 12 and an engine control system 14.

Engine 12 may comprise first and second cylinder banks 16, 18, each having a plurality of cylinders. Referring to FIG. 1, only one cylinder is shown of first cylinder bank 16 for purposes of clarity. Engine 12 further includes a combustion chamber 30, cylinder walls 32, a piston 34, a crankshaft 35, a spark plug 36, an intake manifold 38, exhaust manifolds 40, 41, an intake valve 42, an exhaust valve 44, a throttle body 46, a throttle plate 48, a fuel injector 50, and catalytic converters 52, 53.

Combustion chamber 30 communicates with intake manifold 38 and exhaust manifold 40 via respective intake and exhaust valves 42, 44. Piston 34 is positioned within combustion chamber 30 between cylinder walls 32 and is connected to crankshaft 35. Ignition of an air-fuel mixture within combustion chamber 30 is controlled via spark plug 36 which delivers ignition spark responsive to a signal from distributorless ignition system 54.

Intake manifold 38 communicates with throttle body 46 via throttle plate 48. Throttle plate 48 is controlled by electric motor 55 which receives a signal from ETC driver 56. ETC driver 56 receives a control signal (DC) from a controller 58. Intake manifold 38 is also shown having fuel injector 50 coupled thereto for delivering fuel in proportion to the pulse width of signals (FPW) from controller 58. Fuel is delivered to fuel injector 50 by a conventional fuel system (not shown) including a fuel tank, fuel pump, and fuel rail (now shown). Although port fuel injection is shown, direct fuel injection could be utilized instead of port fuel injection.

Referring to FIG. 2, exhaust manifolds 40, 41 communicate with catalysts 52, 53 respectively, which may comprise three-way catalytic converters for example. Catalysts 52, 53 reduce exhaust gas constituents such as nitrous oxides (NOx) and oxidizes carbon monoxide (CO) and hydrocarbons (HC). As illustrated, exhaust gas sensors 60, 62 are disposed upstream of catalysts 52, 53, respectively and exhaust gas sensors 64, 66 are disposed downstream of catalysts 52, 53, respectively. Exhaust gas sensors 60, 62, 64, 66 may comprise one of an EGO sensor, a HEGO sensor, or a UEGO sensor. Sensors 60, 62 may generate signals FEGO[1], FEGO[2], respectively, indicative of air/fuel ratios in exhaust gases upstream of catalysts 52, 53, respectively. Sensors 64, 66 may generate signals REGO[1], REGO[2], respectively, indicative of air/fuel ratios in exhaust gases downstream of catalysts 52, 53.

Referring to FIG. 1, control system 14 is provided to control the operation of engine 12 and to implement a method for monitoring post-catalyst exhaust gas sensors in accordance with the present invention. Control system 14 includes distributorless ignition system 54, an electric motor 55 for controlling the throttle plate 48, an ETC driver 56, exhaust gas sensors 60, 62, 64, 66, a mass air flow sensor 68, a temperature sensor 70, a throttle position sensor 72, a torque sensor 74, an engine speed sensor 76, a pedal position sensor 78, an accelerator pedal 80, and controller 58.

Mass air flow sensor 68 generates a signal indicating the inducted mass air flow (AM) that is transmitted to controller 58. Sensor 68 may be coupled to the throttle body 46 or intake manifold 38.

Temperature sensor 70 generates a signal indicating the engine coolant temperature (ECT) received by controller 58. Sensor 70 may be coupled to cooling jacket 71 in cylinder wall 36.

Throttle position sensor 72 generates a signal indicating a throttle position (TP) of throttle plate 48 received by controller 58 for closed-loop control of plate 48.

Torque sensor 74 generates a signal (TQ) that may indicate one of following torque values: (i) an engine crankshaft torque, ii) a transmission torque, such as for example, a torque converter turbine torque or a transmission output shaft torque, or (iii) an axle torque.

Engine speed sensor 76 may comprise a hall effect sensor that generates a signal (N) indicating an engine speed. Sensor 76 may be coupled to crankshaft 35 and transmits signal (N) to controller 58.

Accelerator pedal 80 is shown communicating with a driver's foot 82. Pedal position sensor 78 generates a signal indicating acceleration pedal position (PP) that is transmitted to controller 58.

The controller 58 is provided to implement the method for determining degradation of a post-catalyst exhaust gas sensor in accordance with the present invention. The controller 58 includes a microprocessor 84 communicating with various computer-readable storage media. The computer readable storage media preferably include nonvolatile and volatile storage in a read-only memory (ROM) 86 and a random-access memory (RAM) 88. The computer readable media may be implemented using any of a number of known memory devices such as PROMs, EPROMs, EEPROMs, flash memory or any other electric, magnetic, optical or combination memory device capable of storing data, some of which represent executable instructions, used by microprocessor 84 in controlling engine 12. Microprocessor 84 communicates with various sensors and actuators (discussed above) via an input/output (I/O) interface 90. Of course, the present invention could utilize more than one physical controller to provide engine/vehicle control depending upon the particular application.

The underlying theory for determining degradation of a post-catalyst exhaust gas sensor will now be discussed. The inventors herein have recognized that during the operational life of a catalyst such as a catalytic converter, the oxygen storage capacity can only decrease. In other words, the amount of oxygen stored by the catalyst will not increase during the operational life of the catalyst. Further, the inventors herein have developed a strategy for determining an amount of oxygen supplied to the catalyst during periods of lean air-fuel operation. Thus, when the amount of oxygen supplied to the catalyst is greater than an oxygen storage capacity of the catalyst and a post-catalyst exhaust gas sensor does not indicate a lean air-fuel state with respect to stoichiometry, the exhaust gas sensor is determined to be degraded.

Figure 3A:
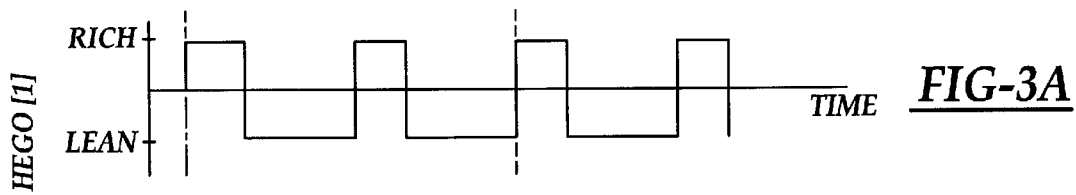
FIGS. 3A–3E are schematics of signals used to determine whether a post-catalyst exhaust gas sensor in a first exhaust bank is degraded.

Referring to FIGS. 3A–3E, the signals utilized or generated by controller 58 for determining degradation of a post-catalyst exhaust gas sensor will be discussed. Referring to FIGS. 3A and 4A, the signals HEGO[1] and HEGO[2] are generated by oxygen sensors 60, 62, respectively. The signals HEGO[1] and HEGO[2] are indicative of combusted air-fuel ratios in cylinder banks 16, 18, respectively. As shown, signal HEGO[1] transitions to a high logic level when a measured oxygen concentration indicates a rich air-fuel state with respect to stoichiometry and a low logic level when the oxygen concentration indicates a lean air-fuel state with respect to stoichiometry. The signal HEGO[2] may transition between a high logic level and a low logic level in a manner similar to signal HEGO[1].

Figure 3B:
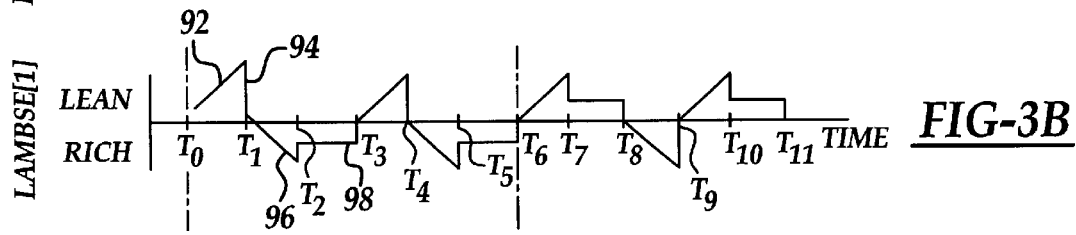
Figure 4A:
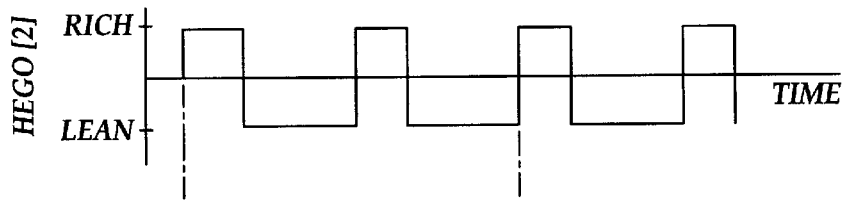
FIGS. 4A–4E are schematics of signals used to determine whether a post-catalyst exhaust gas sensor in a second exhaust bank is degraded.
Figure 4B:
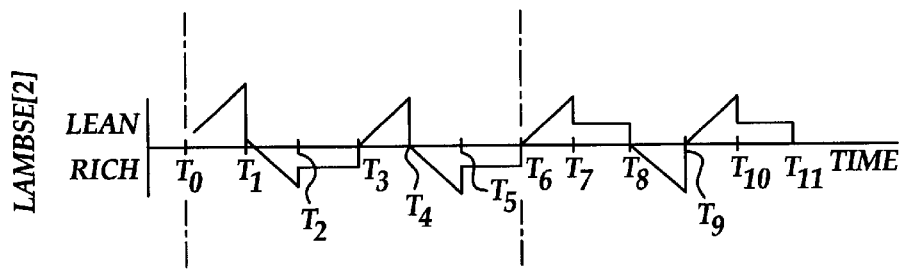

Referring to FIGS. 3B and 4B, the signals LAMBSE[1] and LAMBSE[2] are generated by controller 58 and are indicative of a desired air-fuel ratio for cylinder banks 16, 18, respectively. For purposes of clarity, the generation of signal LAMBSE[1] will be described, although those skilled in the art will recognize the signal LAMBSE[2] can be generated in a similar manner. Referring to FIGS. 3A and 3B, at time $T_0$, the desired air-fuel ratio is steadily increased over time, becoming more leaner, until the exhaust gas sensor 60 detects a lean air-fuel state in the exhaust gases. This portion of signal LAMBSE[1] is referred to as a ramp portion 92 because the air-fuel ratio is being ramped up during this time period. At time $T_1$, when sensor 60 detects the air-fuel ratio has switched to a lean state, LAMBSE[1] is abruptly dropped toward or past stoichiometry. This portion of signal LAMBSE[2] is referred to a jumpback portion 94. Thereafter, signal LAMBSE[1] is steadily decreased, becoming more and more rich, until the air-fuel ratio reaches a particular rich threshold value at time $T_2$. Similar to when the air-fuel ratio steadily increases, this portion of signal LAMBSE[1] is referred to as a ramp portion 96.

At time $T_2$, if an air-fuel ratio is desired that is on average rich of stoichiometry (i.e., a rich fuel bias), based on signal REGO{1] for example, the signal LAMBSE[1] is held (after the jumpback) at a predetermined level to deliver a desired level of rich fuel bias. As illustrated, between times $T_2$–$T_3$, the signal LAMBSE[1] is maintained at a rich level to deliver the desired amount of rich fuel bias. Similarly, if an air-fuel ratio is desired that is on average lean of stoichiometry (i.e., a lean fuel bias), based on signal REGO[1] for example, the signal LAMBSE[1] is held (after the jumpback) at a particular level to deliver a desired amount of lean fuel bias. As illustrated, between times $T_7$–$T_8$, the signal LAMBSE[1] is maintained at a lean level to deliver a desired amount of lean fuel bias. This portion of signal LAMBSE[1] is referred to a hold portion 98.

Those skilled in the art will recognize that signals LAMBSE[1], LAMBSE[2] may be generated based on signals HEGO[1], HEGO[2], respectively and signals REGO[1], REGO[2], respectively, using one of a plurality of known methods. For example, the method disclosed in commonly assigned U.S. Pat. No. 5,357,751 entitled "Air/Fuel Control System Providing Catalytic Monitoring" may be utilized to generate signals LAMBSE[1] and LAMBSE[2], which is incorporated herein in its entirety.

Figure 3C:
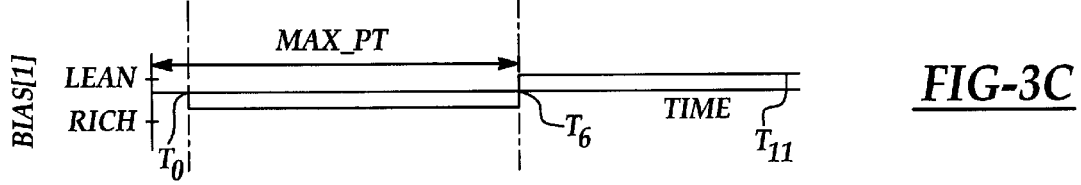
Figure 4C:
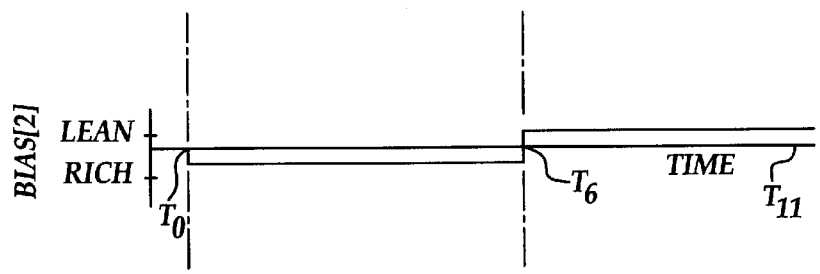

Referring to FIGS. 3C and 4C, the fuel bias signals BIAS[1] and BIAS[2] are generated by controller 58 and correspond to average air-fuel ratios delivered to cylinder banks 16, 18, respectively, by the signals LAMBSE[1], LAMBSE[2], respectively. In particular, the signals BIAS[1] and BIAS[2] represent an average air-fuel ratio either lean or rich of stoichiometry. Referring to FIGS. 3B and 3C, for example, the area between signal BIAS[1] and the stoichiometric reference line between times $T_0$–$T_6$, corresponds to the area between signal LAMBSE[1] and the stoichiometric reference line between times $T_2$–$T_3$ and times $T_5$–$T_6$. Similarly, the area between signal BIAS[1] and the stoichiometric reference line between times $T_6$–$T_{11}$, corresponds to the area between signal LAMBSE[1] and the stoichiometric reference line between times $T_7$–$T_8$ and times $T_{10}$–$T_{11}$.

Figure 3D:
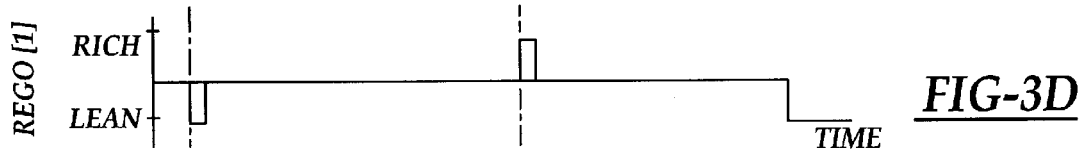
Figure 4D:
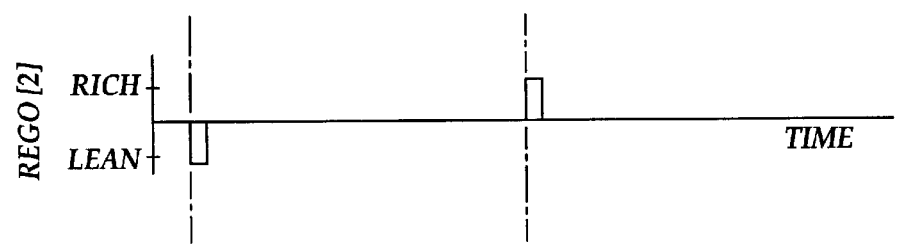

Referring to FIGS. 3D and 4D, the signals REGO[1] and REGO[2] generated by post-catalyst exhaust gas sensors 64, 66, respectively, are illustrated. When signal BIAS[1], for example, switches to a lean air-fuel state, it is indicative that catalytic converter 52 is saturated with oxygen. In particular, the oxygen supplied to converter 52 (during delivery of a lean fuel bias) has completely saturated the oxygen storing elements (e.g., cerium) of converter 52. Alternately, when signal BIAS[1] indicates a rich air-fuel state, it is indicative that catalytic converter 52 has completely reduced the oxygen in the oxygen storage elements of converter 52.

Figure 3E:
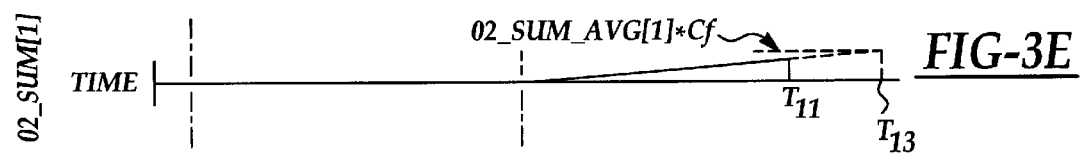
Figure 4E:
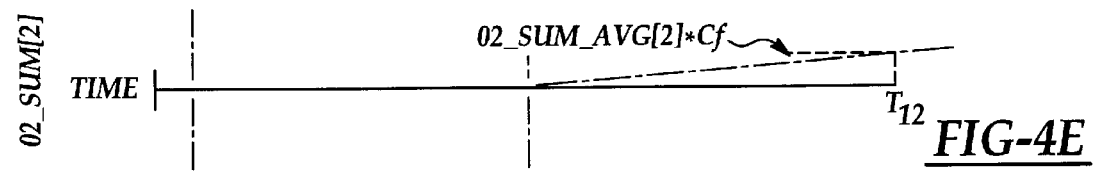

Referring to FIGS. 3E and 4E, the values O2_SUM[1] and O2_SUM[2] are calculated by controller 58 and correspond to an amount of oxygen supplied to catalytic converters 52, 53 during delivery of lean air-fuel mixtures to cylinder banks 16, 18, respectively. The value O2_SUM[1] may be calculated during delivery of a lean fuel bias using the following integral Equation1:

$$O2\_SUM[1]_t = (BIAS[1]*(AM/2)*K_L*\Delta T) + O2\_SUM[1]_{t-1}$$

Where:
BIAS[1]=(moles of oxygen/moles of exhaust gas) delivered to catalyst 52 during a lean fuel bias;
AM/2=air mass flow rate (grams per second) delivered to cylinder bank 16 (and cylinder bank 18). It should be noted that it is assumed that an exhaust flow rate equals the air mass flow rate;
$K_L$=(molecular weight of oxygen/molecular weight of exhaust gas)
(e.g., $K_L$=(32 grams of oxygen/mole)/(28.8 grams of exhaust/mole));
$\Delta T$=the time interval elapsed since the last value of O2_SUM[1] was calculated.

Similarly, the value O2_SUM[2] may be calculated using the following integral Equation2:

$$O2\_SUM[2]_t = (BIAS[2]*(AM/2)*K_L*\Delta T) + O2\_SUM[2]_{t-1}$$

Where:
BIAS[2]=(moles of oxygen/moles of exhaust gas) delivered to catalyst 53 during a lean fuel bias.

Referring to FIGS. 3C and 3E, during delivery of a lean fuel bias between times $T_6$–$T_{11}$, the signal BIAS[1] may be integrated using Equation1 to obtain the value O2_SUM[1] corresponding to the amount of oxygen supplied to catalytic converter 52. Similarly, referring to FIGS. 4C and 4E, during delivery of a lean fuel bias between times $T_6$–$T_{11}$, the value of BIAS[2] may be integrated using Equation2 to obtain the value O2_SUM[2] corresponding to the amount of oxygen supplied to catalytic converter 53.

Figure 5A:
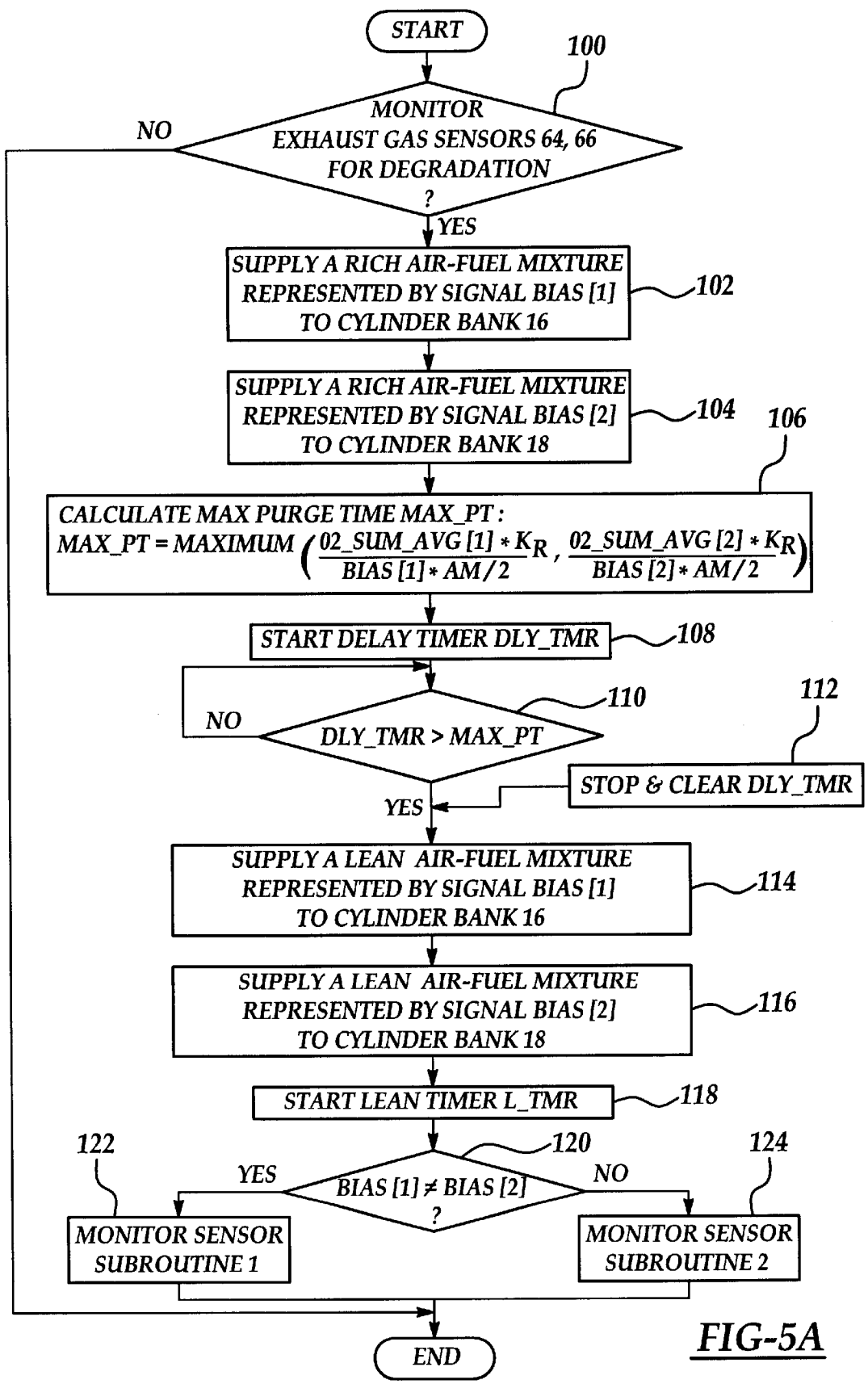
FIGS. 5A–5C are flowcharts of a method of determining degradation of post-catalyst exhaust gas sensors in accordance with the present invention.

Referring to FIG. 5A, a method for determining degradation of a post-catalyst exhaust gas sensor in accordance with the present invention is illustrated. At step 100, a determination is made as to whether to monitor exhaust gas sensors 64, 66 for degradation. For example, when engine 12 is in a low load operating condition or an idle operating condition, controller 58 may monitor sensors 64, 66. If the sensors 64, 66 are to be monitored, the method advances to step 102. Otherwise, the method is exited.

At step 102, an air-fuel mixture that is on average rich of stoichiometry, represented by signal BIAS[1], is delivered to cylinder bank 16. Referring to FIG. 3C, for example, at time $T_0$ the signal BIAS[1] switches to a rich state indicating that a rich air-fuel mixture is being delivered to cylinder bank 16.

Referring again to FIG. 5A, at step 104 an air-fuel mixture that is on average rich of stoichiometry, represented by signal BIAS[2], is delivered to cylinder bank 18. Referring to FIG. 4C, for example, at time $T_0$ the signal BIAS[2] switches to a rich state indicating that a rich air-fuel mixture is being delivered to cylinder bank 18. Thus, steps 102 and 104 are purging stored oxygen from catalytic converters 52, 53. Thereafter, the method advances to step 106.

At step 106, a max purge time MAX_PT needed to purge catalytic converters 52, 53 of oxygen is calculated using the following equation:

$$MAX_{13} PT = \max \text{ of } [(O2\_SUM\_AVG[1]*K_R)/(BIAS[1]*(AM/2)) \text{ or } (O2\_SUM\_AVG[2]*K_R)/(BIAS[2]*(AM/2))]$$

Where:
BIAS[1]=(moles of fuel/moles of exhaust gas) delivered to catalyst 52 during a lean fuel bias;
BIAS[2]=(moles of fuel/moles of exhaust gas) delivered to catalyst 53 during a lean fuel bias;
O2_SUM_AVG[1]=an average maximum oxygen storage amount for catalytic converter 52;
O2_SUM_AVG[2]=an average maximum oxygen storage amount for catalytic converter 53;
$K_R$=(molecular weight of oxygen/molecular weight of exhaust gas*number of grams of oxygen to burn one gram of fuel)
(e.g., $K_R$=(32 grams of oxygen/mole)/(28.8 grams of exhaust/mole)*(3.3 grams of oxygen/1 gram of fuel)).

Next, the method advances to step 108.

Next at step 108, a running delay timer DLY_TMR is started. Next, at step 110, a determination is made as to whether the value of DLY_TMR is greater than a max purge time MAX_PT. If the value of step 110 equals "No", the method re-executes step 110 which waits for the max purge time MAX_PT to elapse. Otherwise, the method advances to step 112 which stops and clears a running delay timer DLY_TMR.

Next at step 114, an air-fuel mixture that is on average lean of stoichiometry, represented by signal BIAS[1], is delivered to cylinder bank 16. Referring to FIG. 3C, for example, at time $T_6$ the signal BIAS[2] switches to a lean state indicating a lean air-fuel mixture is being delivered to cylinder bank 16.

Referring again to FIG. 5A, at step 116 an air-fuel mixture that is on average lean of stoichiometry, represented by signal BIAS[2], is delivered to cylinder bank 18. Referring to FIG. 4C, for example, at time $T_6$ the signal BIAS[2] switches to a lean state indicating that a lean air-fuel mixture is being delivered to cylinder bank 18. Thus, steps 114 and 116 are supplying oxygen to catalytic converters 52, 53, respectively, since by definition lean air-fuel mixtures result in un-combusted oxygen being expelled from cylinder banks 16, 18.

Next at step 120, a determination is made as to whether the signal BIAS[1] is not equal to the signal BIAS[2]. Those skilled in the art will recognize that the average fuel bias delivered to cylinder bank 16 may be equal to or different than the average fuel bias delivered to cylinder bank 18 depending on desired engine operating conditions. When the value BIAS[1] equals the value BIAS[2], cylinder banks 16, 18 would be expelling an equivalent amount of oxygen to catalytic converters 52, 53, respectively. Thus, the amount of oxygen supplied to either of converters 52, 53 could be determined from value BIAS[1] or value BIAS[2]. In contrast, when the value BIAS[1] is not equal to the value BIAS[2], cylinder banks 16, 18 would be expelling different amounts of oxygen to catalytic converters 52, 53, respectively. Thus, the amount of oxygen supplied to converters 52, 53 would be determined based on values BIAS[1], BIAS[2], respectively. If the value of step 120 equals "Yes", the step 122 executes the Monitor Sensor Subroutine1. Otherwise, the step 124 executes the Monitor Sensor Subroutine2.

Figure 5B:
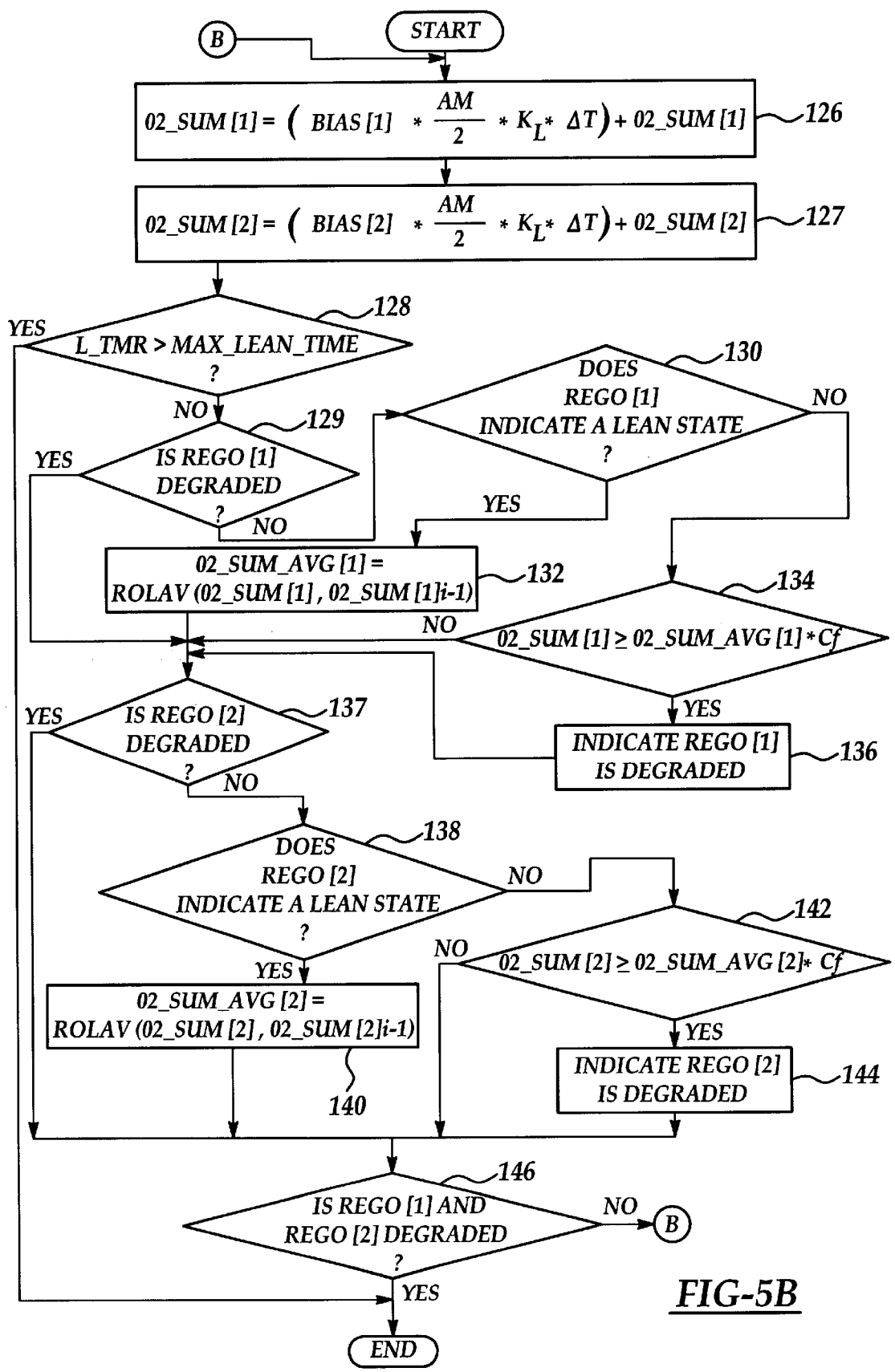

Referring to FIG. 5B, the Monitor Sensor Subroutine1 is illustrated for determining whether post-catalyst exhaust gas sensors 64, 66 are degraded. At step 126, the value O2_SUM[1] indicative of the amount of oxygen supplied to catalytic converter 52 is calculated utilizing Equation1 as discussed above. Next at step 127, the value of O2_SUM[2] indicative of the amount of oxygen supplied to catalytic converter 53 is calculated utilizing Equation2 as discussed above.

At step 128, a determination is made as to whether the value of lean timer L_TMR is greater than a maximum allowable time MAX_LEAN_TIME. The value MAX_LEAN_TIME may be calculated using the following equation:

MAX_LEAN_TIME=max of

[O2_SUM_AVG[1]*$K_L$)/(BIAS[1]*(AM/2)) or (O2_SUM_AVG[2]*$K_L$)/(BIAS[2]*(AM/2))]

If the value of step 128 equals "Yes", the subroutine is exited. Otherwise, the subroutine advances to step 129.

At step 129, a determination is made as to whether the signal REGO[1] was determined to be degraded in a prior iteration of the subroutine. If the value of step 129 equals "Yes", the subroutine advances to step 137 explained in detail below. Otherwise, the subroutine advances to step 130.

At step 130, a determination is made as to whether the signal REGO[1] indicates a lean air-fuel state. If the value of step 130 equals "Yes", the subroutine advances to step 132 which calculates the value O2_SUM_AVG[1] using the following equation:

O2_SUM_AVG[1]=ROLAV(O2_SUM[1], O2_SUM[1]$_{I-1}$)

where the function ROLAV calculates a rolling average value based on the current value of O2_SUM[1] and at least one prior value of O2_SUM[1]. After step 132, the subroutine advances to step 137.

Referring again to step 130, if the value of the signal REGO[1] does not indicate a lean state, the subroutine advances to step 134. At step 134, a determination is made as to whether the value O2_SUM[1] is greater than or equal to the value O2_SUM_AVG[1]*$C_F$ where $C_f$ may equal a constant value within the range of 1.1–1.2, for example. If the value of step 134 equals "Yes", the step 136 indicates that the signal REGO[1] is degraded. Otherwise, the subroutine advances to step 137.

At step 137, a determination is made as to whether the signal REGO[2] was determined to be degraded in a prior iteration of the subroutine. If the value of step 137 equals "Yes", the subroutine advances to step 146 explained in detail below. Otherwise, the subroutine advances to step 138.

At step 138, a determination is made as to whether the signal REGO[2] indicates a lean air-fuel state. If the value of step 138 equals "Yes", the subroutine advances to step 140 which calculates the value O2_SUM_AVG[2] using the following equation:

O2_SUM_AVG[2]=ROLAV(O2_SUM[2], O2_SUM[2]$_{I-1}$)

where the function ROLAV calculates a rolling average value based on the current value of O2_SUM[2] and at least one prior value of O2_SUM[2]. After step 140, the subroutine advances to step 146 explained in detail below.

Referring again to step 138, if the signal REGO[2] does not indicate a lean state, the subroutine advances to step 142. At step 142, a determination is made as to whether the value O2_SUM[2] is greater than or equal to the value O2_SUM_AVG[2]*$C_F$; where $C_f$ equals a constant value such as 1.1 for example. If the value of step 142 equals "Yes", the step 144 indicates that the signal REGO[2] is degraded. Referring to FIG. 4E, for example, at time $T_{12}$ the signal O2_SUM[2] is determined to be degraded. Referring again to step 142, if the value of step 144 equals "No, the subroutine advances to step 146.

At step 146, a determination is made as to whether the signals REGO[1] and REGO[2] have been determined to be degraded. If the value of step 146 equals "Yes", the subroutine is exited. Otherwise, the subroutine advances back to the step 126 for continued monitoring of the sensors 64, 66.

Figure 5C:
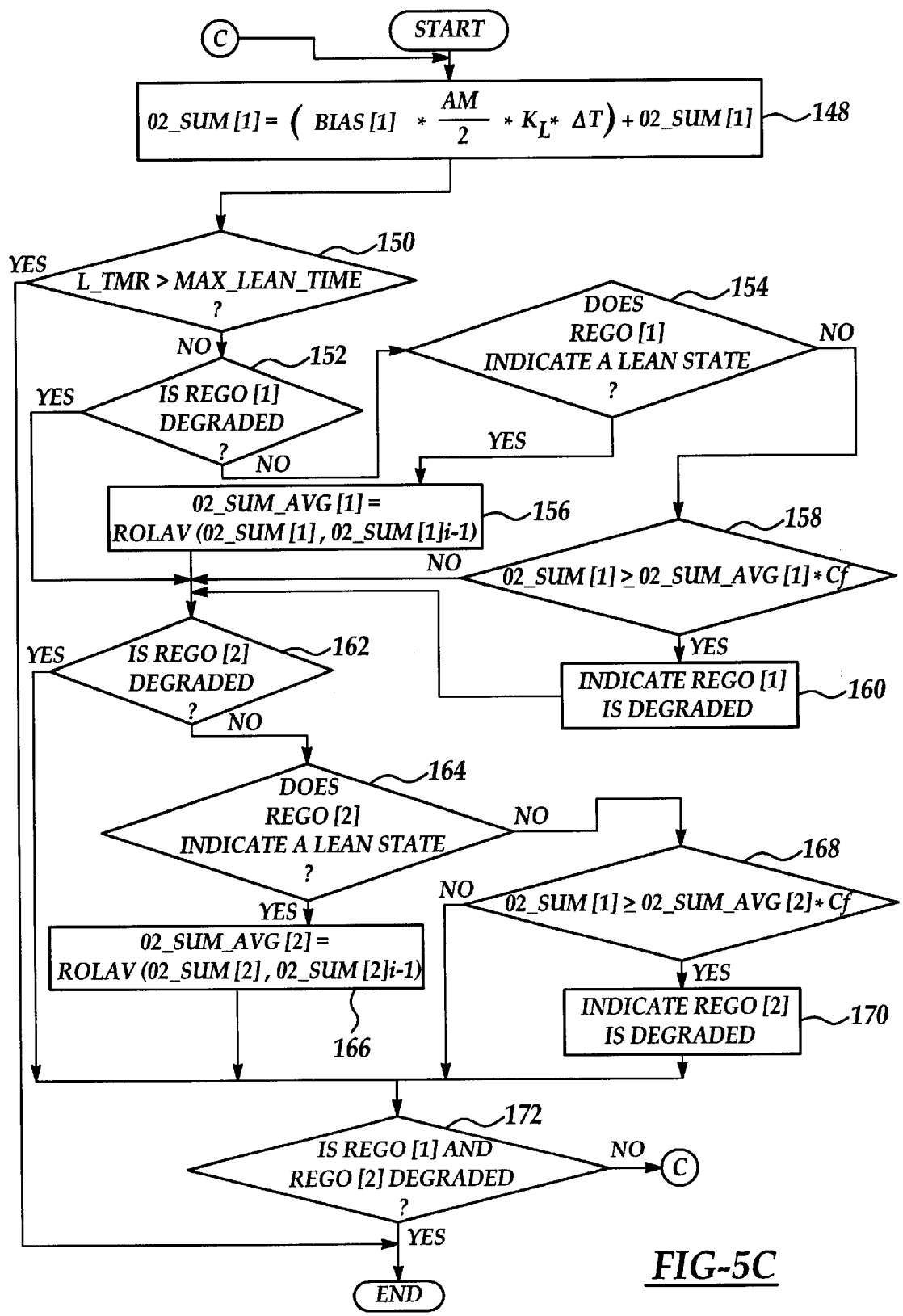

Referring to FIG. 5C, the Monitor Sensor Subroutine2 is illustrated for determining whether post-catalyst exhaust gas sensors 64, 66 are degraded. However, before discussing the subroutine in detail, the possible engine conditions where the subroutine can be advantageously utilized will be explained. Assume for example that pre-catalyst signal HEGO[2] is degraded. In this event, those skilled in the art will recognize that the signal HEGO[1] could be utilized to control the air-fuel delivery to cylinder bank 16 and cylinder bank 18. Further, an equal amount of lean fuel bias could be supplied to cylinder banks 16, 18, resulting in an equal amount of oxygen is being supplied to both catalytic converters 52, 53 during lean operation. Thus, the inventors herein have recognized that an amount of oxygen supplied to catalytic converter 52, for example, could be utilized to monitor both exhaust gas sensors 64, 66. The Monitor Sensor Subroutine2 described below can determine degradation of both post-catalyst sensors 64, 66 even if a pre-catalyst sensor, such as sensor 62, is degraded.

Referring again to FIG. 5C, the Monitor Sensor Subroutine 2 will now be explained. At step 148, the value O2_SUM[1] indicative of the amount of oxygen supplied to catalytic converter 52 is calculated utilizing Equation1 as discussed above. It should be noted that the value O2_SUM[1] corresponds to the amount of oxygen delivered to both catalytic converters 52, 53 since the fuel bias delivered to cylinder banks 16, 18 are equal.

Next at step 150, a determination is made as to whether the value of lean timer L_TMR is greater than a maximum allowable time MAX_LEAN_TIME. If the value of step 150 equals "Yes", the subroutine is exited. Otherwise, the subroutine advances to step 152.

At step 152, a determination is made as to whether the signal REGO[1] was determined to be degraded in a prior iteration of the subroutine. If the value of step 152 equals "Yes", the subroutine advances to step 162 explained in detail below. Otherwise, the subroutine advances to step 154.

At step 154, a determination is made as to whether the signal REGO[1] indicates a lean air-fuel state. If the value of step 154 equals "Yes", the subroutine advances to step 156 which calculates the value O2_SUM_AVG[1] using the following equation:

$$O2\_SUM\_AVG[1] = ROLAV(O2\_SUM[1], O2\_SUM[1]_{i-1})$$

After step 156 the subroutine advances to step 162 explained in detail below.

Referring again to step 154, if the value of the signal REGO[1] does not indicate a lean state, the subroutine advances to step 158. At step 158, a determination is made as to whether the value O2_SUM[1] is greater than or equal to the value $O2\_SUM\_AVG[1]*C_F$ where $C_F$=a constant value such as 1.1 for example. If the value of step 158 equals "Yes", the step 160 indicates that the signal REGO[1] is degraded. Otherwise, the subroutine advances to step 162.

At step 162, a determination is made as to whether the signal REGO[2] was determined to be degraded in a prior iteration of the subroutine. If the value of step 162 equals "Yes", the subroutine advances to step 172 explained in detail below. Otherwise, the subroutine advances to step 164.

At step 164, a determination is made as to whether the signal REGO[2] indicates a lean air-fuel state. If the value of step 164 equals "Yes", the subroutine advances to step 166 which calculates the value O2_SUM_AVG[2] using the following equation:

$$O2\_SUM\_AVG[2] = ROLAV(O2\_SUM[1], O2\_SUM[1]_{i-1})$$

where the function ROLAV calculates a rolling average value based on the current value of O2_SUM[2] and at least one prior value of O2_SUM[2]. After step 166, the subroutine advances to step 172 explained in detail below.

Referring again to step 164, if the signal REGO[2] does not indicate a lean state, the subroutine advances to step 168. At step 168, a determination is made as to whether the value O2_SUM[1] is greater than or equal to the value $O2\_SUM\_AVG[2]*C_F$; where $C_f$ equals a constant value such as 1.1 for example. If the value of step 168 equals "Yes", the step 170 indicates that the signal REGO[2] is degraded. Referring again to FIGS. 3E and 4D, for example, at time $T_{13}$, the signal O2_SUM[1] (shown as a dashed line) becomes greater than O2_SUM_AVG[2] (i.e., O2_SUM_AVG[2]=$O2\_SUM[1]*C_f$) without the signal REGO[2] indicating a lean state. Thus, the signal REGO[1] becomes degraded at time $T_{13}$. Referring again to FIG. 5C, if the value of step 168 equals "No", the subroutine advances to step 172.

At step 172, a determination is made as to whether the signals REGO[1] and REGO[2] have been determined to be degraded. If the value of step 172 equals "Yes", the subroutine is exited. Otherwise, the subroutine advances back to the step 148.

The system 14 and method for determining degradation of post-catalyst exhaust gas sensors in accordance with the present invention provide a substantial advantage over conventional systems and methods. In particular, the system and method can accurately determine post-catalyst sensor degradation without assuming the post-catalyst sensors are non-degraded as done by known systems and methods.

I claim:

1. A method for determining degradation of a first exhaust gas sensor utilized in an engine, said engine coupled to one or more catalysts, said method comprising:
   generating a first signal from a first exhaust gas sensor disposed downstream of a first catalyst;
   determining an amount of oxygen supplied to one of said catalysts; and,
   determining degradation of said first exhaust gas sensor based on said amount of supplied oxygen and said first signal.

2. The method of claim 1 wherein said one of said catalysts comprises said first catalyst, said first catalyst communicating with a first cylinder bank of said engine.

3. The method of claim 2 wherein said step of determining said amount of supplied oxygen includes:
   supplying an air-fuel mixture that is on average rich of stoichiometry to said first cylinder bank to remove oxygen stored in said first catalyst;
   supplying an air-fuel mixture that is on average lean of stoichiometry to said first cylinder bank; and
   determining said amount of oxygen supplied to said first catalyst based on an amount of said average lean air-fuel mixture delivered to said first cylinder bank.

4. The method of claim 2 wherein said step of determining degradation of said first exhaust gas sensor includes:
   comparing said amount of oxygen supplied to said first catalyst to a predetermined oxygen amount; and
   indicating said first exhaust gas sensor is degraded when said amount of supplied oxygen is greater than said predetermined oxygen amount and said first signal does not indicate an air-fuel ratio lean of stoichiometry.

5. The method of claim 2 wherein said engine includes a second cylinder bank coupled to a second catalyst, and a second exhaust gas sensor coupled downstream of said second catalyst generating a second signal, said method further comprising:
   determining an amount of oxygen supplied to said second catalyst; and
   determining degradation of said second exhaust gas sensor based on said amount of oxygen supplied to said second catalyst and said second signal.

6. The method of claim 2 wherein said engine includes a second cylinder bank coupled to a second catalyst, and a second exhaust gas sensor coupled downstream of said second catalyst generating a second signal, said method further comprising:
   determining degradation of said second exhaust gas sensor based on said amount of oxygen supplied to said first catalyst and said second signal.

7. The method of claim 1 further including indicating when to monitor said first exhaust gas sensor for degradation.

8. The method of claim 1 wherein said engine includes a first cylinder bank coupled said first catalyst and a second cylinder bank coupled to a second catalyst, wherein said one of said catalysts comprises said second catalyst.

9. The method of claim 8 wherein said step of determining an amount of oxygen supplied to said second catalyst includes:

supplying an air-fuel mixture that is on average rich of stoichiometry to said first and second cylinder banks to remove oxygen stored in said first and second catalysts, respectively, supplying an air-fuel mixture that is on average lean of stoichiometry to said first and second cylinder banks; and calculating said amount of oxygen supplied to said second catalyst based on an amount of said average lean air-fuel mixture supplied to said second cylinder bank.

10. The method of claim 8 wherein said step of determining degradation of said first exhaust gas sensor includes:

comparing said amount of oxygen supplied to said second catalyst to a predetermined oxygen amount; and indicating said first exhaust gas sensor is degraded when said amount of oxygen supplied to said second catalyst is greater that said predetermined oxygen amount and said first signal does not indicate an air-fuel ratio lean of stoichiometry.

11. The method of claim 8 further including indicating when to monitor said first exhaust gas sensor for degradation.

12. A system for determining degradation of an exhaust gas sensor utilized in an engine, said engine coupled to first and second catalysts, said system comprising:

a first exhaust gas sensor coupled downstream of said first catalyst generating a first signal; and a controller operably coupled to said first exhaust gas sensor, said controller configured to determine an amount of oxygen supplied to one of said first and second catalysts, said controller further configured to determine degradation of said first exhaust gas sensor based on said amount of supplied oxygen and said first signal.

13. The system of claim 12 wherein said first catalyst comprises a three-way catalytic converter.

14. The system of claim 12 wherein said controller is further configured to indicate when to monitor said first exhaust gas sensor for degradation.

15. The system of claim 12 wherein said controller is further configured to compare said amount of oxygen supplied to said first catalyst to a predetermined oxygen amount, and to indicate said first exhaust gas sensor is degraded when said amount of oxygen supplied to said first catalyst is greater than said predetermined oxygen amount and said first signal does not indicate an air-fuel ratio lean of stoichiometry.

16. The system of claim 12 wherein said controller is further configured to compare said amount of oxygen supplied to said second catalyst to a predetermined oxygen amount, and to indicate said first exhaust gas sensor is degraded when said amount of oxygen supplied to said second catalyst is greater than said predetermined oxygen amount and said first signal does not indicate an air-fuel ratio lean of stoichiometry.

* * * * *